United States Patent
Schuhmann et al.

(10) Patent No.: US 12,528,754 B2
(45) Date of Patent: Jan. 20, 2026

(54) PROCESS FOR PREPARING METHANOL

(71) Applicant: L'Air Liquide, Société Anonyme pour l'Etude et l'Exploitation des Procédés Georges Claude, Paris (FR)

(72) Inventors: Timm Schuhmann, Bensheim (DE); Thomas Wurzel, Frankfurt am Main (DE); Bryce Williams, Frankfurt am Main (DE); Veronika Gronemann, Karben (DE); Tobias Oelmann, Bad Vilbel (DE); Stéphane Haag, Frankfurt am Main (DE); Nga Thi Quynh Do, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 427 days.

(21) Appl. No.: 17/920,201

(22) PCT Filed: Apr. 9, 2021

(86) PCT No.: PCT/EP2021/025133
§ 371 (c)(1),
(2) Date: Oct. 20, 2022

(87) PCT Pub. No.: WO2021/213700
PCT Pub. Date: Oct. 28, 2021

(65) Prior Publication Data
US 2023/0339831 A1    Oct. 26, 2023

(30) Foreign Application Priority Data
Apr. 20, 2020 (EP) .................................. 20020186

(51) Int. Cl.
*C07C 31/04* (2006.01)
*C07C 29/151* (2006.01)
*C07C 29/153* (2006.01)

(52) U.S. Cl.
CPC .......... *C07C 31/04* (2013.01); *C07C 29/1518* (2013.01); *C07C 29/153* (2013.01)

(58) Field of Classification Search
CPC ... C07C 31/04; C07C 29/1518; C07C 29/153; C07C 29/1512
See application file for complete search history.

(56) References Cited

U.S. PATENT DOCUMENTS

2021/0363007 A1    11/2021    Vicari et al.

FOREIGN PATENT DOCUMENTS

WO    WO 2020 048809    3/2020

OTHER PUBLICATIONS

Chinchen, G.C. et al., Applied Catalysts, 36 (1988) 1-65.
(Continued)

*Primary Examiner* — Jafar F Parsa
(74) *Attorney, Agent, or Firm* — Elwood L. Haynes

(57) ABSTRACT

The invention relates to a process for preparing methanol, in which a synthesis gas comprising carbon oxides and hydrogen is provided, which is passed at elevated pressure and elevated temperature through a catalyst bed of a methanol synthesis catalyst for conversion of the synthesis gas to methanol to obtain a product stream comprising crude methanol and unreacted synthesis gas. Unreacted synthesis gas is recycled to the catalyst bed inlet and combined with the synthesis gas, resulting in a mixed synthesis gas. The mixed synthesis gas at the catalyst bed inlet has a stoichiometry number SN of ≥0.80, the catalyst bed in the conversion of the mixed synthesis gas to methanol has a maximum catalyst bed temperature of ≤280° C., and the (Continued)

mixed synthesis gas at the catalyst bed inlet has a carbon monoxide concentration of ≤20% by volume.

12 Claims, 4 Drawing Sheets

(56) References Cited

OTHER PUBLICATIONS

Coteron, A., et al., Kinetics of the synthesis of methanol from $CO + H_2$ and $CO + CO_2 + H_2$ over copper-based amorphous catalysts, Chemical Engineering Science, 1994, 49, No. 2, 209-221.

Eisfeld, B., The influence of confining walls on the pressure drop in packed beds, Chemical Engineering Science, 2001, 56(14), 4321-4329.

Ergun, S., Fluid flow through packed cols. Chem. Eng. Prog., 1952, 48, 89-94.

Graaf, G.H. et al., Chemical equilibria in methanol synthesis, Chemical Engineering Science 1986, 41, No. 11, 2883-2890.

Graaf, G.H. et al., Kinetics of low-pressure methanol synthesis, Chemical Engineering Science, 1988, 43, No. 12, 3185-3195.

Int'l Methanol Producers & Consumers Association, IMPCA methanol reference specifications, Dec. 8, 2015, downloaded on Oct. 10, 2022 at http://www.methanol.org/wp-content/uploads/2016/07/IMPCA-Ref-Spec-08-December-2015.pdf, 15 pages.

Jeschar, V.R., Druckverlust in Mehrkornschuttungen aus Kugeln with English abstract, Archiv für das Eisenhüttenwesen, 1964, 35(2), 91-108.

The Properties of Gases and Liquide, B.E. Poling et al. editors, $5^{th}$ edition, vol. 5, McGraw-Hill, New York, 2001, Ch. 1 the Estimation of Physical Properties, 1.1-1.9.

Skrzypek, J. et al., Kinetics of methanol synthesis over commercial copper/zinc oxide/alumina catalysts, Chemical Engineering Science, 1991, 46, No. 11, 2809-2813.

Soave, G., Equilibrium constants from a modified Redlich-Kwong equation of state, Chemical Engineering Science, 1972, vol. 27, 1197-1203.

Zhavoronkov, N.M. et al., Hydraulic resistance and packing density of a disperse layer, Zh. Fiz. Khim, 1949, 23(10), 342-360.

International Search Report and Written Opinion for corresponding PCT/EP2021/025133, Jul. 12, 2021.

| No. | p / barg | SN_in | $y_{CO_2}$_in / vol% | $y_{CO}$_in / vol% | $X\_H_2$ / % | Tmax / °C | high Alc / ppm | Ketone / ppm | Ether / ppm | Ester / ppm | HC / ppm | Total / ppm |
|---|---|---|---|---|---|---|---|---|---|---|---|---|
| 1 | 73,2 | 9,57 | 1,87 | 6,71 | 95,6 | 262 | 1150 | 39,9 | 1200 | 433 | 66,0 | 2890 |
| 2 | 73,2 | 9,44 | 1,92 | 6,77 | 95,2 | 263 | 1150 | 39,1 | 1170 | 416 | 64,3 | 2830 |
| 3 | 73,2 | 7,08 | 2,73 | 8,52 | 93,8 | 269 | 1560 | 53,5 | 1300 | 562 | 59,2 | 3540 |
| 4 | 80,0 | 4,62 | 6,46 | 7,88 | 83,9 | 277 | 1620 | 62,6 | 845 | 959 | 50,1 | 3540 |
| 5 | 85,0 | 3,7 | 7,85 | 9,52 | 81,4 | 268 | 985 | 65,5 | 448 | 1200 | 56,8 | 2750 |
| 6 | 85,0 | 3,72 | 7,85 | 9,49 | 81,3 | 263 | 694 | 52,6 | 243 | 1260 | 37,8 | 2290 |
| 7 | 85,0 | 3,72 | 7,83 | 9,5 | 81,3 | 260 | 638 | 49,1 | 210 | 1220 | 34,3 | 2150 |
| 8 | 70,0 | 2,63 | 11,4 | 9,79 | 90,2 | 236 | 239 | 13,9 | 72,5 | 1950 | 11,7 | 2280 |
| 9 | 70,0 | 2,03 | 13,4 | 10,9 | 92,2 | 235 | 239 | 13,9 | 72,5 | 1950 | 11,7 | 2280 |
| 10 | 50,0 | 1,75 | 14,2 | 12,9 | 89,4 | 264 | 2160 | 104 | 446 | 1570 | 51,1 | 4330 |
| 11 | 80,0 | 1,76 | 13,6 | 9,56 | 98,2 | 273 | 3100 | 126 | 939 | 1810 | 80,1 | 6050 |
| 12 | 79,9 | 1,45 | 14,5 | 9,05 | 98,7 | 267 | 2850 | 125 | 866 | 1890 | 71,3 | 5800 |
| 13 | 65,0 | 1,95 | 13,0 | 14,8 | 77,5 | 254 | 936 | 82,5 | 182 | 2740 | 53,3 | 3990 |
| 14 | 70,0 | 1,97 | 13,5 | 11,4 | 91,2 | 233 | 180 | 20,8 | 56,1 | 2220 | 8,78 | 2490 |
| 15 | 80,0 | 2,09 | 13,2 | 12,5 | 86,8 | 243 | 142 | 21,5 | 43,7 | 2680 | 5,19 | 2900 |
| 16 | 70,0 | 2,01 | 13,1 | 12,3 | 88,9 | 231 | 896 | 73,7 | 208 | 2030 | 52,7 | 3260 |
| 17 | 65,0 | 1,97 | 13,5 | 11,6 | 91,0 | 268 | 1820 | 93,1 | 417 | 1850 | 51,3 | 4230 |
| 18 | 50,0 | 1,88 | 12,4 | 16,7 | 66,8 | 272 | 5510 | 237 | 763 | 2970 | 123 | 9600 |
| 19 | 65,0 | 1,98 | 13,1 | 13,0 | 86,2 | 243 | 470 | 55,2 | 105 | 2260 | 25,9 | 2910 |
| 20 | 50,0 | 1,76 | 14,6 | 9,20 | 96,7 | 235 | 402 | 41,8 | 128 | 1650 | 23,9 | 2240 |
| 21 | 70,0 | 1,88 | 13,8 | 12,9 | 87,0 | 231 | 196 | 31,2 | 48,0 | 2230 | 9,84 | 2520 |
| 22 | 30,1 | 1,7 | 13,8 | 16,0 | 73,3 | 239 | 414 | 46,0 | 127 | 1600 | 24,3 | 2210 |
| 23 | 70,0 | 1,98 | 13,9 | 10,6 | 91,9 | 235 | 229 | 22,2 | 64,1 | 1970 | 10,1 | 2290 |
| 24 | 73,2 | 9,02 | 1,81 | 7,20 | 96,9 | 260 | 1090 | 42,9 | 400 | 490 | 62,4 | 2080 |
| 25 | 95,0 | 4,26 | 6,38 | 5,7 | 83,2 | 267 | 1120 | 42,5 | 326 | 879 | 52,7 | 2420 |
| 26 | 82,3 | 5,03 | 5,58 | 6,29 | 92,9 | 267 | 1290 | 51,1 | 344 | 770 | 67,4 | 2520 |
| 27 | 82,5 | 6,7 | 4,40 | 5,65 | 92,5 | 266 | 928 | 33,8 | 301 | 597 | 45,7 | 1900 |
| 28 | 95,0 | 4,92 | 5,23 | 5,07 | 84,5 | 264 | 2210 | 67,0 | 358 | 1850 | 34,2 | 4520 |

Fig. 3a

| No. | p / barg | SN_in | yCO2_in / vol% | yCO_in / vol% | X_H2 / % | Tmax / °C | high Alc / ppm | Ketone / ppm | Ether / ppm | Ester / ppm | HC / ppm | Total / ppm |
|---|---|---|---|---|---|---|---|---|---|---|---|---|
| 29 | 95,0 | 4,91 | 5,68 | 5,73 | 89,3 | 267 | 1090 | 40,9 | 330 | 749 | 53,1 | 2260 |
| 30 | 82,3 | 5,3 | 5,17 | 6,11 | 93,3 | 266 | 859 | 32,0 | 287 | 726 | 38,0 | 1940 |
| 31 | 82,5 | 5,86 | 5,04 | 6,35 | 92,5 | 268 | 898 | 33,7 | 303 | 708 | 42,6 | 1990 |
| 32 | 60,0 | 3,26 | 7,06 | 14,3 | 76,3 | 266 | 2070 | 132 | 349 | 2070 | 44,2 | 4660 |
| 33 | 80,0 | 2,53 | 16,5 | 1,97 | 95,0 | 255 | 1720 | 55,2 | 182 | 2890 | 16,0 | 4870 |
| 34 | 89,8 | 2,06 | 23,7 | 0,498 | 41,2 | 257 | 98,7 | 1,63 | 44,3 | 586 | 0 | 731 |
| 35 | 89,5 | 2,04 | 23,9 | 0,417 | 33,5 | 234 | 38,4 | 2,72 | 13,7 | 680 | 0 | 735 |
| 36 | 90,0 | 2,06 | 23,8 | 0,375 | 29,3 | 218 | 21,7 | 3,37 | 6,73 | 931 | 0 | 963 |
| 37 | 90,0 | 0,941 | 33,0 | 0,487 | 31,3 | 218 | 12,0 | 4,71 | 4,82 | 889 | 0 | 910 |
| 38 | 90,0 | 0,916 | 33,2 | 0,508 | 40,9 | 234 | 14,4 | 5,03 | 4,50 | 878 | 0 | 902 |
| 39 | 90,0 | 0,891 | 33,5 | 0,581 | 45,5 | 256 | 118 | 5,99 | 19,0 | 766 | 0 | 909 |
| 40 | 89,3 | 1,54 | 27,3 | 0,489 | 44,1 | 257 | 111 | 5,09 | 18,1 | 747 | 0 | 882 |
| 41 | 89,8 | 1,59 | 26,9 | 0,48 | 36 | 234 | 49,8 | 6,47 | 10,0 | 794 | 0 | 860 |
| 42 | 89,8 | 1,64 | 26,6 | 0,464 | 26,8 | 218 | 26,1 | 6,80 | 5,42 | 935 | 0 | 974 |
| 43 | 90,0 | 1,46 | 25,6 | 3,26 | 54,2 | 218 | 22,1 | 5,70 | 4,60 | 826 | 0 | 858 |
| 101 | 70,0 | 0,494 | 12,1 | 41,1 | 97,8 | 255 | 11800 | 445 | 1100 | 17500 | 130 | 31000 |
| 102 | 70,0 | 0,371 | 11,4 | 47,4 | 97,6 | 242 | 9350 | 318 | 872 | 14400 | 87,3 | 25000 |
| 103 | 50,2 | 0,713 | 10,6 | 39,4 | 93,2 | 253 | 11700 | 311 | 1070 | 10900 | 131 | 24000 |
| 104 | 50,0 | 0,505 | 10,5 | 45,0 | 95,5 | 234 | 6840 | 237 | 675 | 10000 | 63,3 | 17900 |
| 105 | 70,0 | 0,338 | 13,7 | 45,2 | 97,4 | 242 | 7850 | 281 | 758 | 15100 | 73,3 | 24100 |

Fig. 3b

PROCESS FOR PREPARING METHANOL

CROSS REFERENCE TO RELATED APPLICATIONS

This application is a 371 of International Application No. PCT/EP2021/025133, filed Apr. 9, 2021, which claims priority to European Patent Application No. EP 20020186.1, filed Apr. 20, 2020, the entire contents of which are incorporated herein by reference.

FIELD OF THE INVENTION

The invention relates to a process for preparing methanol, to a plant configured for performance of the process according to the invention for preparation of methanol, and to the use of the plant in the process according to the invention for preparation of methanol.

PRIOR ART

Synthesis gases which contain at least carbon oxides (carbon monoxide and carbon dioxide) and hydrogen, and are preparable from any hydrocarbon source, can be converted to methanol over suitable catalysts according to reactions (1) and (2)

$$CO + 2H_2 \rightleftharpoons CH_3OH \qquad (1)$$

$$CO_2 + 3H_2 \rightleftharpoons CH_3OH + H_2O \qquad (2).$$

It is a prerequisite that the catalyst poisons have been removed from the synthesis gas down to a tolerable threshold, and the composition of the synthesis gas has a suitable stoichiometry number SN, defined as $$SN = \frac{n(H_2) - n(CO_2)}{n(CO) + n(CO_2)}, \text{ with } n \text{ in [mol]},$$

For synthesis gases used for methanol synthesis, it is regularly a requirement that SN values are above 2.0, or above 2.5, or even above 3.0. An SN value above 2.0 indicates a hydrogen surplus, an SN value below 2.0 a hydrogen deficiency.

It is the general view among specialists in the field that the use of synthesis gas compositions with a stoichiometry number of only just above 2.0 or even below 2.0 in methanol synthesis leads to intolerable formation of by-products.

A high degree of by-product formation represents a low selectivity with respect to the methanol target product, and hence leads to an undesirably low methanol yield.

If large amounts of by-products are formed, it may be the case that these cannot be removed from the crude methanol obtained as the primary product by thermal separation processes that immediately follow the methanol preparation, for example by a rectification. Moreover, there is a rise in energy consumption in the thermal separation process used and/or a rise in the loss of methanol as a result of by-products that are difficult to separate from the methanol target product owing to similar physical properties (such as boiling point, vapour pressure). The general view among specialists in the field is that, with decreasing stoichiometry number of the synthesis gas used, the formation of by-products becomes so high that workup of the crude methanol by means of the thermal separation process that immediately follows the methanol preparation will not give sufficiently pure methanol, which may be the case, for example, when by-product concentrations are more than 10000 ppm (1% by weight) in the crude product.

There is thus a need for improvement in existing processes.

SUMMARY

One problem addressed by the present invention is that of providing a process for producing methanol which at least partially overcomes the disadvantages of the prior art.

A further problem addressed by the present invention is that of providing a process for preparing methanol that features reduced formation of by-products.

A further problem addressed by the present invention is that of providing a process for preparing methanol that enables the use of synthesis gases of low stoichiometry number for methanol synthesis, and that simultaneously features reduced formation of by-products.

A further problem addressed by the present invention is that of providing a plant for preparing methanol that at least partially solves at least one of the aforementioned problems.

The independent claims provide a contribution to the at least partial solution of at least one of the aforementioned problems. The dependent claims provide preferred embodiments which contribute to the at least partial solution of at least one of the problems. Preferred embodiments of constituents of one category according to the invention are, where relevant, likewise preferred for identically named or corresponding constituents of a respective other category according to the invention.

The aforementioned problems are at least partly solved by a process for preparing methanol, wherein the process comprises the following process steps which need not necessarily be performed in the sequence specified:

a. providing a synthesis gas including carbon oxides and hydrogen;
b. passing the synthesis gas at elevated pressure and elevated temperature through a catalyst bed of a methanol synthesis reactor for conversion of the synthesis gas to methanol to obtain a product stream comprising crude methanol and unreacted synthesis gas;
c. cooling the product stream for condensation and separation of crude methanol comprising at least methanol and water from the cooled product stream;
d. recycling at least a portion of the unreacted synthesis gas to the catalyst bed inlet, wherein the unreacted synthesis gas is combined with the synthesis gas to obtain a mixed synthesis gas, and passing the mixed synthesis gas at elevated pressure and elevated temperature through the catalyst bed of the methanol synthesis catalyst for conversion of the mixed synthesis gas to methanol, characterized in that
the mixed synthesis gas at the catalyst bed inlet has a stoichiometry number SN of ≥0.80, where $$SN = \frac{n(H_2) - n(CO_2)}{n(CO) + n(CO_2)}, \text{ with } n \text{ in [mol]},$$

the catalyst bed in the conversion of the mixed synthesis gas to methanol has a maximum catalyst bed temperature of ≤280° C., and the mixed synthesis gas at the catalyst bed inlet has a carbon monoxide concentration of ≤20% by volume.

It has been found that, surprisingly, the formation of by-products can be suppressed when
- the maximum temperature in the catalyst bed, i.e. the maximum catalyst bed temperature, is limited to a maximum of 280° C.,
- the stoichiometry number of the mixed synthesis gas at the catalyst bed inlet is at least 0.80 and
- the mixed synthesis gas at the catalyst bed inlet has a carbon monoxide concentration of not more than 20 percent by volume.

Detailed studies have shown that the crude methanol obtained always has a concentration of less than 10000 ppm of by-products when the parameters defined in accordance with the invention are observed. The by-product content reported in ppm relates here to the total mass of by-products formed relative to the mass of crude methanol separated from the product mixture by cooling, the crude methanol being composed of methanol ($CH_3OH$), water ($H_2O$) and unavoidable by-products. For example, a concentration of 6500 ppm of by-products means that 6500 mg of by-products per kg of crude methanol has been formed.

The process according to the invention is configured as what is called a methanol synthesis circuit, meaning that a portion of the synthesis gas unconverted in the catalyst bed (unreacted synthesis gas) is separated from the condensed crude methanol phase by cooling and resultant phase separation, and returned, i.e. recycled, to the catalyst bed inlet. This recycled synthesis gas is combined with the synthesis gas to obtain the mixed synthesis gas. Accordingly, it is the mixed synthesis gas, for conversion of the synthesis gas to methanol, that is passed at elevated pressure and elevated temperature through the catalyst bed to obtain a product stream comprising crude methanol and unreacted synthesis gas in turn. The synthesis gas may also be referred to as "fresh" synthesis gas, fresh gas or makeup gas. The recycled synthesis gas may also be referred to as return gas or recycle gas. The unreacted synthesis gas is returned completely or partly to the catalyst bed inlet and combined with the synthesis gas. It is regularly the case that the unreacted synthesis gas is only partly recycled, since typically a portion of the unreacted synthesis gas is branched off from the unreacted synthesis gas as purge gas. This is intended to prevent accumulation of constituents inert under the conditions of the methanol synthesis, for example methane or nitrogen, in the methanol synthesis circuit. In addition, the purge gas can be sent, for example, to a pressure swing absorption (PSA) in order to separate hydrogen from the other constituents of the purge gas. The hydrogen thus obtained can be fed, for example, to the synthesis gas in order to adjust the stoichiometry number thereof to a desired value.

It has been found that, surprisingly, the stoichiometry number of the mixed synthesis gas at the catalyst bed inlet needs to have a comparatively low minimum value of just 0.80 for by-products to be formed to a minor degree, as described above in terms of quantity, in conjunction with the further parameters defined.

The stoichiometry number of the mixed synthesis gas at the catalyst bed inlet should be strictly distinguished here from the stoichiometry number of the synthesis gas or fresh gas. Synthesis gas produced as the primary product has a stoichiometry number of about 1.7 to 2.2 according to the preparation method. The mixing of the streams of the synthesis gas and of the recycled synthesis gas and optionally supply of internally or externally produced hydrogen can vary the stoichiometry number of the mixed synthesis gas at the catalyst bed inlet over a much wider range.

A comparatively low stoichiometry number of 0.80 means that the mixed synthesis gas is low in hydrogen and rich in carbon oxides (carbon monoxide and carbon dioxide). This opens up the possibility of using unmodified synthesis gas, i.e. synthesis gas that has not been enriched with hydrogen via an internal or external source, in the process according to the invention. This is the case at least when the carbon monoxide concentration in the mixed synthesis gas does not exceed a concentration of 20% by volume, and a maximum catalyst bed temperature of 280° C. is simultaneously observed.

A preferred embodiment of the process according to the invention is characterized in that the catalyst bed in the conversion of the mixed synthesis gas to methanol has a maximum catalyst bed temperature of ≤265° C. If the maximum catalyst bed temperature is controlled in such a way that a temperature of 265° C. is not exceeded, the formation of unwanted by-products is suppressed further. Studies have shown that the amount of unwanted by-products drops to 5000 ppm or less if the maximum catalyst bed temperature is limited to 265° C.

Further preferably, the catalyst bed in the conversion of the mixed synthesis gas to methanol has a maximum catalyst bed temperature of ≤250° C. If the maximum catalyst bed temperature is limited to 250° C., the concentration of unwanted by-products drops to 3500 ppm or less, as studies have shown.

A preferred embodiment of the process according to the invention is characterized in that the catalyst bed in the conversion of the mixed synthesis gas to methanol has a maximum catalyst bed temperature of 205° C. to 280° C.

A further preferred embodiment of the process according to the invention is characterized in that the catalyst bed in the conversion of the mixed synthesis gas to methanol has a maximum catalyst bed temperature of 205° C. to 265° C.

A preferred embodiment of the process according to the invention is characterized in that the mixed synthesis gas at the catalyst bed inlet has a stoichiometry number SN of ≥2.0. If the stoichiometry number of the mixed synthesis gas is adjusted such that it assumes a value of 2.0 or greater at the catalyst bed inlet for the mixed synthesis gas, the formation of unwanted by-products in the crude methanol can be further suppressed. Studies have shown that the concentration of by-products in the crude methanol in this case is always 5000 ppm or less.

A preferred embodiment of the process according to the invention is characterized in that the mixed synthesis gas at the catalyst bed inlet has a stoichiometry number SN of 0.80 to 10.0.

A further preferred embodiment of the process according to the invention is characterized in that the mixed synthesis gas at the catalyst bed inlet has a stoichiometry number of 0.80 to 2.20. It has been found that, surprisingly, less than 10000 ppm of by-products is formed even when the stoichiometry number of the mixed synthesis gas at the catalyst bed inlet is limited to 2.20 and the further conditions according to the invention with regard to minimum stoichiometry number and maximum carbon monoxide concentration in the mixed synthesis gas at the catalyst inlet and the maximum catalyst bed temperature are satisfied. In this connection, it is further preferable here that the mixed synthesis gas at the catalyst bed inlet has a carbon monoxide concentration of 9.0% to 13.0% by volume. This simultaneously achieves high hydrogen conversions of 80% or more, and in the case of observance of further boundary parameters even of 90% or more. Hydrogen is the "most valuable" of the gases in a synthesis gas mixture, particularly in the case of synthesis gases that are obtained by autothermal reforming or by partial oxidation. This too is applicable in the case of conversion of carbon dioxide-rich synthesis gases to methanol. The latter technology is gaining ever greater significance. This is because, in view of the discussion of anthropogenic climate change and $CO_2$ pricing, there is an increase in both environmental and economic interest in valorization of carbon dioxide. Thus, the aforementioned technologies always have the aim of a high hydrogen conversion in the preparation of methanol.

A preferred embodiment of the process according to the invention is characterized in that the synthesis gas has a stoichiometry number SN of 1.0 to 2.85, preferably a stoichiometry number SN of 1.0 to 2.30. The process according to the invention is also suitable for the synthesis gases with a low stoichiometry number, especially with a stoichiometry number of 2.0 or less. It is a feature of such synthesis gases that they are low in hydrogen and/or rich in carbon dioxide compared to carbon monoxide. The process according to the invention is thus also suitable for unmodified synthesis gases that are not reliant on an internal or external hydrogen source, and for synthesis gases comprising mainly or even exclusively carbon dioxide in relation to the carbon oxides.

In one embodiment of the process according to the invention, the ratio of unreacted recycled synthesis gas to synthesis gas in the mixed synthesis gas, defined as the recirculation rate RR, where $$RR = \frac{\text{volume flow rate (recycled synthesis gas)}}{\text{volume flow rate (synthesis gas)}}$$

is 2.0 to 4.5. The volume flow rate of the recycled synthesis gas in this case is at least twice up to four-and-a-half times the volume flow rate of the (fresh) synthesis gas.

A preferred embodiment of the process according to the invention is characterized in that the mixed synthesis gas at the catalyst bed inlet has a carbon dioxide concentration of ≥20.0% by volume. It has been found that, surprisingly, synthesis gases having a very high carbon dioxide content of 20.0 percent by volume or more lead to formation of a very low level of unwanted by-products, provided that the further conditions according to the invention are observed. Studies have shown in this case that the concentration of unwanted by-products in crude methanol is always below 1000 ppm. Thus, the process according to the invention is especially suitable for synthesis gases that are rich in carbon dioxide and low in carbon monoxide. The mixed synthesis gas in this embodiment preferably has a carbon monoxide concentration of less than 5% by volume, or less than 3% by volume, or less than 1% by volume. This may be, for example, a synthesis gas that has been mixed with a relatively large amount of an offgas from a combustion plant.

A preferred embodiment of the process according to the invention is characterized in that the catalyst bed is divided into a multitude of catalyst bed stages arranged in series, wherein step c) is conducted downstream of each of the catalyst bed stages. In this embodiment, also referred to as multi-reactor concept or multi-reactor stage concept, a condensation of crude methanol formed in each of the catalyst bed stages takes place thereafter, and the crude methanol is accordingly discharged from the process at multiple points. The more reactor stages or catalyst bed stages are used, the less unreacted synthesis gas has to be recycled to the inlet of the first catalyst bed stage. The carbon yield can be improved by a multitude of catalyst bed stages.

A preferred embodiment of the process according to the invention is characterized in that step b) is performed at a pressure of 30 to 120 bar, preferably at a pressure of 40 to 90 bar. The pressure ranges specified correspond to the customary pressures used in the preparation of methanol in modern low-pressure processes.

A preferred embodiment of the process according to the invention is characterized in that step b) is performed at a space velocity of 2000 to 16000 m$^3$ (STP)/(m$^3$h). The space velocities specified correspond to dwell times of the reactants in the catalyst bed that lead to particularly high carbon conversion rates.

A preferred embodiment of the process according to the invention is characterized in that a portion of the unreacted synthesis gas is removed as purge gas. This prevents any great amounts of constituents that are inert under the conditions of the methanol synthesis from accumulating in the methanol synthesis circuit.

A preferred embodiment of the process according to the invention is characterized in that the synthesis gas is converted to methanol in the catalyst bed at a cooling temperature of the cooling medium used of 190° C. to 250° C., The choice of the appropriate temperature of the cooling medium or coolant, typically pressurized boiling water, can be used to set the maximum catalyst bed temperature accordingly.

The problems addressed by the invention are also at least partly solved by a plant for preparation of methanol, configured for performance of the process according to the invention in one of the aforementioned embodiments.

The problems addressed by the invention are also at least partly solved by the use of the plant according to the invention in a process according to any of the aforementioned embodiments for preparation of methanol.

Catalyst, Catalyst Bed

The catalyst bed is a fixed bed based on a methanol synthesis catalyst known to the person skilled in the art. The fixed bed of the catalyst bed, in one example, is configured as a bed of loose particles, for example pellets, for example in tablet or cylinder form. In a further example, the fixed bed of the catalyst bed is configured as a structured catalyst, for example with porous monolithic structure.

In association with subjects of the invention, the catalyst bed inlet is understood to mean a region which is upstream of the catalyst bed, and in which no conversion of synthesis gas and/or mixed synthesis gas to crude methanol has taken place as yet. Preferably, the catalyst bed inlet is understood to mean a region immediately upstream of the catalyst bed. In other words, the synthesis gas enters the catalyst bed immediately downstream of the catalyst bed inlet.

The methanol synthesis catalyst may be any catalyst known to the person skilled in the art. In one example, it is a catalyst based on copper as catalytically active species. Examples of further constituents, especially of a copper-based catalyst, are zinc oxide, alumina, chromium oxide, titanium oxide, zirconium oxide (zircon) and magnesium oxide. One example of a frequently used catalyst is a catalyst comprising at least copper, ZnO and $Al_2O_3$. Copper-based catalysts are usable, for example, over a temperature range from 180° C. to 300° C.

Maximum Catalyst Bed Temperature

If a synthesis gas mixture enters a cooled methanol synthesis reactor, the temperature of the synthesis gas is usually lower at first than the temperature of the coolant used.

The coolant used is either a gaseous or liquid coolant. One example of a gaseous coolant is a synthesis gas and/or recycle gas used, which is preheated by the cooling of the process gases. One example of a liquid coolant is boiling water under elevated pressure, which is evaporated by the cooling of the reaction mixture and can subsequently be used as export steam or within the process as heating steam or process steam.

A first portion of the catalyst bed serves to heat the synthesis gas, with transfer of heat from the coolant to the synthesis gas and the catalyst. In the course of this, the reaction to form methanol gradually commences, in which, owing to the exothermic character of the reaction, heat is generated and the temperature both of the catalyst and of the gas mixture (synthesis gas and gaseous methanol/water, and unreacted synthesis gas) is increased. As the reaction progresses further, the temperature of the catalyst bed and of the gas mixture corresponds roughly to the coolant temperature.

In a second portion of the catalyst bed, the reaction continues, with further generation of heat and further heating of the catalyst bed and the gas mixture. The rate of generation of heat in this second portion of the catalyst bed is faster than the heat transfer from the coolant, such that the temperatures of the gas mixture and of the catalyst bed rise above the temperature of the coolant. The heat generated in the reaction first heats the solid catalyst. Subsequently, heat is transferred from the catalyst to the gas mixture in order to cool the catalyst. Subsequently, the gas mixture transfers the heat to the coolant used in the reactor. A further type of heat transfer is convection of heat from the solid catalyst to the reactor internals. The temperature in this portion of the catalyst bed rises well above that of the coolant. In the course of the reaction, consumption of the reactants continues, and more and more crude methanol is produced. Since the catalytic methanol synthesis is an equilibrium reaction, the reaction rate and hence also the rate of production of heat approach a limit on attainment of the equilibrium concentration of reactants and products.

In a third portion of the catalyst bed, the rate of production of heat slows, since the reaction is approaching equilibrium conditions. The transfer of heat from the catalyst to the gas mixture and ultimately to the cooling system nevertheless continues, and enables further lowering of the catalyst bed temperature.

In a last, fourth part of the catalyst bed, the reaction is at equilibrium without significant production of heat. In this portion of the catalyst bed, the temperature falls further in the direction of the coolant temperature.

The maximum catalyst bed temperature accordingly occurs, as described above, between the second and third parts of the catalyst bed. At this temperature maximum, the rate of formation of heat of reaction is roughly in equilibrium with the rate of heat transfer, such that the temperature at this point in the catalyst bed neither rises nor falls.

In practice, the maximum catalyst bed temperature can be measured directly by known methods. On the laboratory or pilot plant scale, for example, it is possible to position a thermowell within the catalyst bed and move a thermocouple manually to different positions within the thermowell in order to measure the temperature in longitudinal direction along the catalyst bed. The profile of the catalyst bed temperature can be ascertained in this way in a reactor tube, in which case the turning point of the profile corresponds to the maximum catalyst bed temperature.

On the industrial scale, for example, it is possible to use a multipoint thermocouple in order to monitor the temperature simultaneously at multiple measurement positions along the catalyst bed. A further alternative for use on the industrial scale is the use of multiple thermocouples positioned in various reactor channels and at different heights within the catalyst bed. In this way, it is possible to generate a complete picture of the temperature distribution in the catalyst bed throughout the reactor.

It is costly and inconvenient to use such measurement devices in industrial reactors in order to directly measure the maximum catalyst bed temperature. Therefore, in the design phase of a plant, but also as a routine reactor monitoring tool, it is possible to use a simulation of the reactor conditions in the state of operation in order to model the reaction rate in accordance with the reaction kinetics measured and the given gas composition. A number of references relating to the kinetics of methanol reaction is available to the person skilled in the art. Examples are given in the following table:

| | |
|---|---|
| Coteron, A; Hayhurst, AN | Kinetics of the synthesis of methanol from $CO + H_2$ and $CO + CO_2 + H_2$ over copper-based amorphous catalysts. In: Chemical Engineering Science 49 (1994), No. 2, p. 209-221 |
| Graaf, GH; Sijtsema, PJJM; Stamhuis, EJ; Joosten, GEH | Chemical equilibria in methanol synthesis. In: Chemical Engineering Science 41 (1986), No. 11, p. 2883-2890 |
| Graaf, GH; Stamhuis, EJ; Beenackers, AACM: | Kinetics of low-pressure methanol synthesis. In: Chemical Engineering Science 43 (1988), No. 12, p. 3185-3195 |
| Skrzypek, J; Lachowska, M; Moroz, H: | Kinetics of methanol synthesis over commercial copper/zinc oxide/alumina catalysts. In: Chemical Engineering Science 46 (1991), No. 11, p. 2809-2813 |

FIG. 1 shows a computer simulation ("calculated") compared to experimentally determined data ("data") from a commercial tubular reactor for the preparation of methanol. The catalyst bed temperature simulated and measured is plotted against the normalized length of the tubular reactor. Also shown is the coolant temperature ("Tcool"), which is 232° C. in the case shown. Also apparent from the image in FIG. 1 are the four temperature regions of the catalyst bed, corresponding to the above elucidations. The maximum catalyst bed temperature in this example is about 254° C. The example also shows that it is possible to protect the actual conditions in the reactor with very high accuracy on the basis of a computer simulation.

Furthermore, in accordance with the model concepts as elucidated above, it is possible to model heat and mass transfer within the catalyst bed, from the catalyst bed to the gas phase, and finally heat transfer to the cooling surfaces within the reactor. The table that follows contains a collection of references to typical models and correlations that are used for the abovementioned processes. Such models can be created by a person skilled in the art, and require some additional known or easily measurable parameters such as the physical proper-ties of the catalyst, pressure drop correlations and equations of state for the gas mixture.

| | |
|---|---|
| Eisfeld, B.; Schnitzlein, K. | The influence of confining walls on the pressure drop in packed beds. Chemical Engineering Science, 56(14): 4321-4329, 2001. |

| | |
|---|---|
| Zhavoronkov, N.M., Aerov, M.E., Umnik, N.N.. | Hydraulic resistance and packing density of a disperse layer. Zh. Fiz. Khim, 23(1): 342-360, 1949. |
| Jeschar, R. | Druckverlust in Mehrkornschüttungen aus Kugeln. Archiv für das Eisenhüttenwesen, 35(2): 91-108, 1964. |
| Poling, B.E., et al. | The properties of gases and liquids, Volume 5, McGraw-Hill, New York, 2001 |
| Ergun, S. | Fluid flow through packed columns. Chem. Eng. Prog., 48: 89-94, 1952. |
| Soave, G | Equilibrium constants from a modified Redlich-Kwong equation of state. In: Chemical Engineering Science 27 (1972), No. 6, p. 1197-1203 |

The maximum catalyst bed temperature can be influenced and monitored in various ways, in order to adjust the operating point of the reactor such that it is within a predetermined process window.

During the design phase of the reactor, it is possible to predict the maximum catalyst bed temperature, as shown above, by a simulation. In order to influence the maximum catalyst bed temperature, it is possible to adjust a number of reactor properties known to a person skilled in the art. For example, it is possible to alter the coolant temperature in order to increase or lower the maximum catalyst bed temperature. It is also possible to alter the dimensions of the catalyst bed for improvement of the heat transfer properties. One example of this is the use of a multitude of tubes having relatively small diameter in a tubular reactor for improvement of heat transfer, which lowers the maximum catalyst bed temperature. Alternatively, it is possible to reduce the distance between the cooling plates in order to lower the maximum catalyst bed temperature. In addition, it is possible to increase the gas volume flow rate in order to lower the maximum catalyst bed temperature. Furthermore, it is possible to alter the gas composition such that the reactivity is reduced and the maximum catalyst bed temperature accordingly falls. This can be effected via the synthesis gas composition or via the addition of steam and/or methanol. A further option in the design phase is the reformulation of the catalyst to adjust the catalyst activity. This can be effected by altering the physical properties of the catalyst, for example by using catalyst pellets of different size with the same composition, or by diluting the active catalyst material with different amounts of inert support material. The catalyst activity can also be altered chemically by using a greater or lesser amount of active catalyst materials that are known to the person skilled in the art.

The methanol reactor is part of a synthesis circuit with at least partial recycling of the unreacted synthesis gas. In this way, it is also possible to control the maximum catalyst bed temperature via the recirculation rate RR. Especially with rising stoichiometry number SN, a greater recirculation rate leads to lowering of the maximum catalyst temperature since the gas mixture includes less reactive gas that simultaneously assures improved heat transfer. In addition, for control of the maximum catalyst temperature, it is possible to adjust the coolant temperature over a narrow range by adjusting the pressure in the coolant vapour drum. In the case that particular restrictions prevent the establishment of the maximum catalyst temperature, it is still possible during a plant shutdown to replace the catalyst with one or more catalysts having a different activity profile, which allows the maximum catalyst bed temperature to be adjusted as a function of catalyst activity.

By-Products

The crude methanol formed in the catalytic reaction of synthesis gas and/or mixed synthesis gas to give methanol comprises water and additionally unavoidable by-products. The most commonly occurring groups of by-products are
  hydrocarbons, which are frequently also referred to as waxes, for example hexane, heptane,
  ethers, especially dimethyl ether, and ethers having longer carbon chains,
  esters, for example methyl formate and ethyl formate,
  ketones, for example acetone, methyl ethyl ketone, and
  higher alcohols, for example ethanol.

The total amount of the by-products in the crude methanol is, for example, the total amount of all the individual groups mentioned above.

A detailed discussion of the classes of by-product in the preparation of methanol can be found in G. C. Chinchen et al., Appl. Catal, 36 (1988) 1-65.

Elevated Pressure

For the catalytic reaction to give methanol, the synthesis gas is passed through the catalyst bed at elevated pressure, also called reaction pressure. The reaction pressure is the prevailing and required pressure for the catalytic reaction of the constituents of the synthesis gas and/or mixed synthesis gas to give methanol, in order to convert the synthesis gas and/or mixed synthesis gas to methanol. In one example, the reaction pressure in the catalyst bed is 30 to 120 bar, preferably 40 to 90 bar, more preferably 75 to 90 bar and further preferably 75 to 85 bar.

Synthesis Gas

The synthesis gas includes at least hydrogen ($H_2$) and carbon oxides. The term "carbon oxides" covers the compounds carbon monoxide (CO) and carbon dioxide ($CO_2$). Based on the total volume of the carbon oxides, the synthesis gas preferably has a carbon monoxide content of at least 20% by volume. The synthesis gas preferably has a high carbon monoxide content. In one example, the synthesis gas comprises, in relation to the carbon oxides, at least 50% by volume of carbon monoxide, or at least 70% by volume, or at least 90% by volume, or at least 95% by volume, or at least 99% by volume. In one example, the synthesis gas, in relation to the carbon oxides, comprises virtually exclusively carbon monoxide, in which case carbon dioxide is present only in traces. Such a synthesis gas is obtainable, for example, by treatment of a crude synthesis gas in a methanol scrubbing. Carbon dioxide may be virtually completely removed in a methanol scrubbing or other suitable gas scrubbing processes. The selective Rectisol® process is a process particularly suitable therefor.

The process according to the invention is additionally also suitable for synthesis gases having a high carbon dioxide content, which, in relation to the carbon oxides, contain a carbon dioxide content of at least 50% by volume, or at least 75% by volume, or at least 90% by volume, of carbon dioxide. This means that carbon can also be made available to the methanol synthesis from a carbon dioxide source, which is gaining increasing significance in the context of the discussion of anthropogenic climate change.

The synthesis gas may derive from any source known to those skilled in the art. Examples are steam reforming, partial oxidation or autothermal reforming of natural gas or other suitable carbon sources, and gasification of coal or other solid fuels such as biomass or communal waste. Carbon dioxide in the synthesis gas can also derive from an offgas source, for example a refuse incineration plant. The hydrogen in the synthesis gas may also derive from a hydrogen electrolysis plant, in which case the electrical power for this plant has preferably been generated by a renewable energy source such as water power, wind power or photovoltaics.

Irrespective of the source from which it derives, the synthesis gas may be produced at a temperature between 400° C. and 1200° C. and/or at a pressure between 10 and 60 bar. Apart from the abovementioned constituents, the synthesis gas may also contain different amounts of inert constituents such as methane or nitrogen. Inert constituents are in particular to be understood as meaning constituents inert under the conditions of methanol synthesis, i.e. constituents which are not converted to methanol or (unwanted) by-products under the conditions of methanol synthesis.

The synthesis gas is typically cooled to below the dew point of steam to condense out water before being used in the process according to the invention. The synthesis gas is especially cooled to below 100° C., preferably to below 60° C. and further preferably to 40° C. or lower in order to separate water from the synthesis gas after condensation. The synthesis gas is thus especially free or largely free from water.

Hydrogen Conversion, Carbon Conversion

The hydrogen conversion and carbon conversion are respectively the proportion of hydrogen present in the fresh synthesis gas and that of carbon present in carbon monoxide or carbon dioxide that is ultimately converted to crude methanol. The sum total of the carbon converted from carbon monoxide and carbon dioxide is the total carbon conversion. The conversion is lowered by the amount of, for example, purge gas branched off or gases dissolved in the crude methanol. Dissolved gases are those constituents of the synthesis gas that remain dissolved in the crude methanol on condensation of the crude methanol. In the case of a two-stage condensation with a high-pressure and low-pressure separator, for example, they can be outgassed from the crude methanol in the low-pressure separator. According to this example, the resultant formulation for the calculation of the conversion is $$X_i = 1 - \left( \frac{n(\text{purge gas}) + n(\text{dissolved gases})}{n (\text{fresh gas})} \right)$$

with the conversion $X_i$ of constituent i in mol/mol and the molar amounts of the respective constituent (hydrogen, carbon monoxide or carbon dioxide) in the purge gas (n(purge gas)), dissolved gases (n(dissolved gases)) and fresh gas (n(fresh gas)) in mol.

Methanol Synthesis Circuit, Recirculation Rate

Since methanol formation from carbon oxides and hydrogen is an equilibrium reaction, unreacted synthesis gas is returned as recycle gas to the catalyst bed inlet in order to achieve maximum carbon and hydrogen conversions. This case is referred to as a synthesis circuit, by contrast with once-through methods. Over customary copper/zinc oxide/aluminium oxide-based catalysts, it is thus possible to achieve carbon conversions of 99% or more under optimal conditions, meaning that 99% or more of the carbon used, whether in the form of carbon monoxide or carbon dioxide, is ultimately recovered in bound form in methanol. The ratio of recycled unreacted synthesis gas (recycle gas) to freshly used synthesis gas is also referred to as the recirculation rate RR defined as $$R = \frac{\text{volume flow rate (recycled gas)}}{\text{volume flow rate (synthesis gas)}}$$

with values of up to 4 not being unusual. This means that the amount of the recycled unreacted synthesis gas may be up to 4 times the amount of (fresh) synthesis gas used.

BRIEF DESCRIPTION OF THE DRAWINGS

For a further understanding of the nature and objects for the present invention, reference should be made to the following detailed description, taken in conjunction with the accompanying drawings, in which like elements are given the same or analo-gous reference numbers and wherein:

FIG. 3a illustrates a tabular compilation of the results achieved with the pilot plant according to FIG. 2.

FIGS. 3a and 3b illustrates a tabular compilation of the results achieved with the pilot plant according to FIG. 2.

DETAILED DESCRIPTION OF THE PREFERRED EMBODIMENTS

Figure 1:
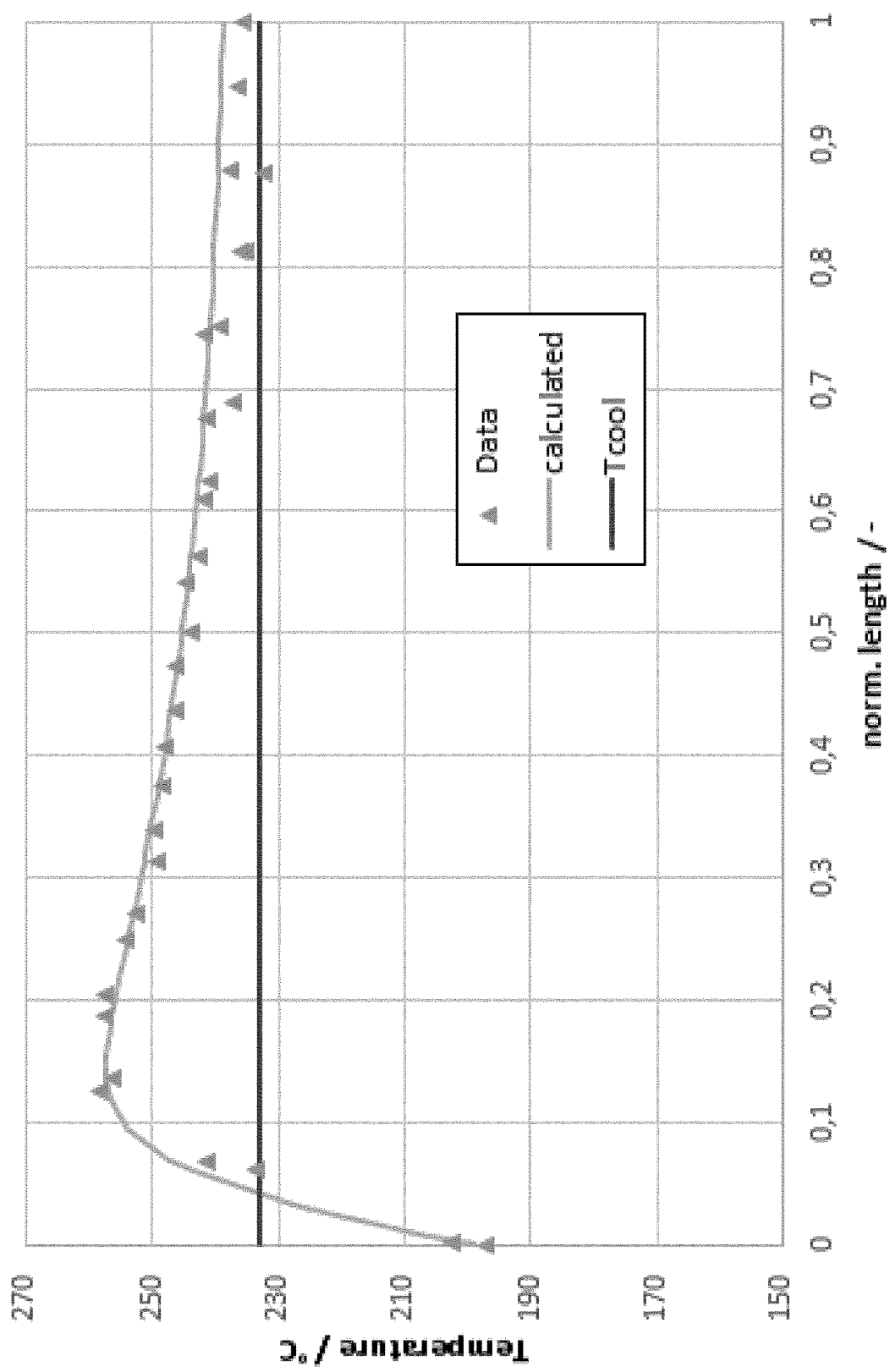
FIG. 1 illustrates a temperature profile, ascertained by measurement and by a simulation, of the catalyst bed over the length of a tubular methanol reactor, which indicates the maximum catalyst bed temperature.

FIG. 1 shows a typical temperature profile along the catalyst bed of a methanol synthesis reactor, as elucidated above.

Figure 2:
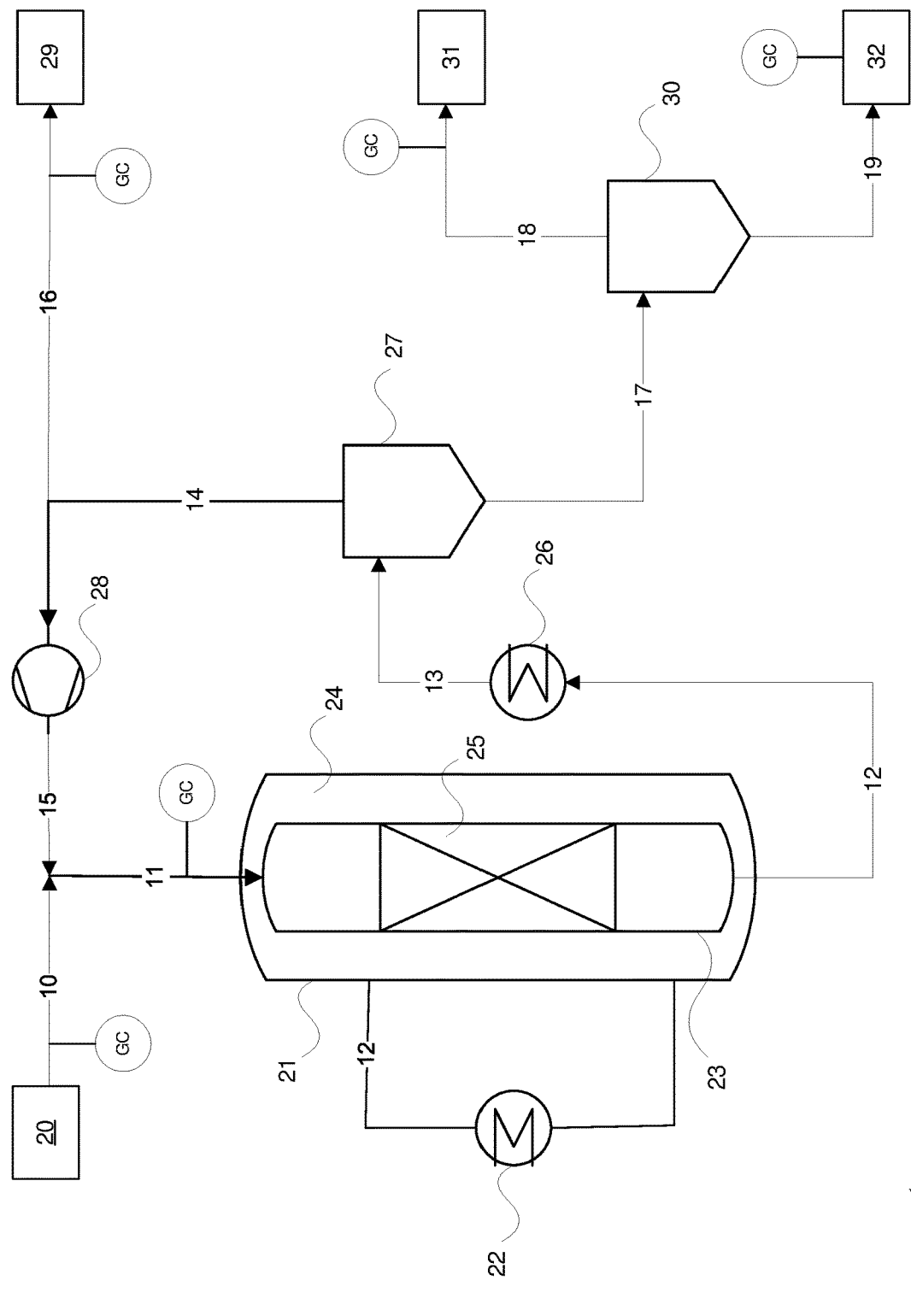
FIG. 2 illustrates a simplified schematic process flow diagram of a pilot plant for performance of the process according to the invention according to the numerical examples illustrated in FIGS. 3a and 3b.

FIG. 2 shows the process scheme of a pilot plant 1 for methanol synthesis that has been used for characterization of the process according to the invention and for determining the results according to the tabular compilation of FIGS. 3a and 3b.

In a mixing station 20, a steam-preheated synthesis gas (heating not shown) consisting of hydrogen, carbon monoxide and carbon dioxide is produced from the corresponding pure gases provided in technical grade quality and introduced at elevated pressure (p in barg) via conduits 10 and 11 into the water-cooled reactor 21.

The composition of the synthesis gas is varied in accordance with Examples 1 to 43 and noninventive Examples 101 to 105 (see FIGS. 3a and 3b) in such a way as to result in a stoichiometry number (SN_MUG) for fresh synthesis gas in conduit 10 of between 0.97 and 2.17.

Water-cooled reactor 21 is cooled with boiling water under elevated pressure by means of heat exchanger 22 and a water circuit 12 coupled to a steam generator (not shown). The cooling water flows around a reaction tube 23 of reactor 21 in cooling jacket 24. The reaction tube 23 (external diameter×wall thickness=33.7 mm×4.05 mm; volume=3 dm³) has a catalyst bed 25 filled with cylindrical catalyst pellets (Clariant Megamax 800, 6×4 mm) based on Cu/ZnO/Al₂O₃. The catalyst bed height is 501 cm. The cooling jacket temperature (T(cool)), i.e. the temperature of the preheated synthesis gas, is varied in accordance with the examples of FIGS. 3a and 3b so as to result in different maximum catalyst bed temperatures (Tmax). The temperature profile within the catalyst bed 25, which also includes the maximum catalyst bed temperature, is ascertained in accordance with the method described above with the aid of a thermowell and a multipoint thermocouple (not shown), in order to detect the temperatures at different positions within the catalyst bed 25.

The crude methanol produced in the reaction tube 23 of the reactor 21, containing methanol, water and unavoidable impurities, is drawn off via conduit 12, precooled in heat exchanger 26 and fed to a high-pressure separator 27 via conduit 13. In the high-pressure separator 27, there is a phase separation into a liquid methanol-water phase (crude methanol) and a gaseous phase including essentially unreacted synthesis gas. The unreacted synthesis gas is drawn off as recycle gas stream via conduit 14 from the high-pressure separator 27 and fed to a compressor 28 (recycle gas compressor) in which the recycle gas is compressed to reaction pressure. Via conduit 15, the recycle gas stream is combined with the synthesis gas stream from conduit 10 in conduit 11, which gives a mixed synthesis gas as combined stream in conduit 11. The composition of the mixed synthesis gas results from the ratio of the fresh synthesis gas stream in conduit 10 and the recycle gas stream in conduit 15. The mixed synthesis gas has a stoichiometry number (SN_in) that differs from the stoichiometry number of the fresh synthesis gas (SN_MUG). The stoichiometry number of the mixed synthesis gas at the catalyst bed inlet is determined by gas chromatography analysis of the composition of the mixed synthesis gas, as indicated in FIG. 2 (gas chromatography—GC). The ratio of recycle gas stream to synthesis gas stream, the recirculation rate (RR), is varied over a range from 0.194 to 4.44 according to the numerical examples of FIGS. 3a and 3b.

A purge gas is branched off via conduit 16 from the recycle gas in conduit 14 and discharged from the process via intermediate vessel 29 (not shown). The branching-off of the purge gas prevents the accumulation of inert constituents within the methanol synthesis circuit.

Crude methanol is drawn off from high-pressure separator 27 as liquid phase via conduit 17 and fed to low-pressure separator 30. Further gas constituents remaining in the crude methanol that were dissolved until this process step are separated from the crude methanol in low-pressure separator 30, and these leave the low-pressure separator 30 via conduit 18 and are discharged from the process via intermediate vessel 31 (not shown).

Condensed crude methanol is drawn off from the low-pressure separator 30 via conduit 19, collected in collecting vessel 32 and subjected to a gas chromatography analysis (GC) for determination of the by-products formed. The results are listed in detail in the tabular compilation of FIGS. 3a and 3b.

Further sampling points for gas chromatography analyses are accordingly labelled "GC" in FIG. 2. Samples are taken at regular intervals, for example every hour, in order to monitor the conversion to methanol and the selectivity of the reaction. The gas chromatography method used is derived from the method of the International Methanol Producers & Consumers Association (IMPCA), described, for example, at http://www.methanol.org/wp-content/uploads/2016/07/IMPCA-Ref-Spec-08-December-2015.pdf.

The tabular compilation of FIGS. 3a and 3b shows the experimental results that have been obtained with a pilot plant according to the above descriptions and as shown in FIG. 2. The examples listed are the inventive Examples 1 to 43 and the noninventive Comparative Examples 101 to 105. What are shown in detail in the columns from left to right are as follows:

| Column (from left to right) | Unit | |
|---|---|---|
| No. | | Examples No. 1 to 43 Comparative Examples No. 101 to 105 |
| p | barg | Pressure in the reactor (synthesis pressure) in bar gauge |
| SN_in | | Stoichiometry number of the mixed synthesis gas at the catalyst bed inlet |
| $yCO_2\_in$ | % by vol. | Proportion of $CO_2$ in the mixed synthesis gas at the catalyst bed inlet |
| yCO_in | % by vol. | Proportion of CO in the mixed synthesis gas at the catalyst bed inlet |
| $XH_2$ | % | Conversion of hydrogen |
| Tmax | °C. | Maximum catalyst bed temperature |
| High alc | ppm | Concentration of higher alcohols in the crude methanol |
| Ketones | ppm | Concentration of ketones in the crude methanol |
| Ethers | ppm | Concentration of ethers in the crude methanol |
| Esters | ppm | Concentration of esters in the crude methanol |
| HC | ppm | Concentration of hydrocarbons in the crude methanol |
| Total | ppm | Total concentration of by-products (higher alcohols, ketones, ethers, esters and hydrocarbons) in the crude methanol |

The cooling temperature Tcool of the cooling medium was varied over a range from about 200° C. to about 250° C. in order to establish a corresponding maximum catalyst bed temperature Tmax. The fresh synthesis gas or fresh gas had a stoichiometry number SN_MUG between 0.97 and 2.17. The recirculation rate RR was varied between about 0.2 and about 4.5 depending on the composition (stoichiometry number) of the fresh synthesis gas SN_MUG and the desired stoichiometry number of the mixed synthesis gas at the catalyst bed inlet SN_in. The gas hourly space velocity was varied between about 2200 and 16000 $m^3$ (STP)/($m^3$h).

All figures in ppm are based on mass (mg/kg).

With the settings mentioned, carbon dioxide conversions $XCO_2$ of up to 97.0%, carbon monoxide conversions XCO of up to 99.9%, and total carbon conversions $XCO_2$ (carbon dioxide and carbon monoxide cumulatively) of up to 99.6% were achieved.

The proportion of hydrogen $yH_2\_in$ at the catalyst bed inlet is calculated from the stoichiometry number SN_in, and also $yCO_2\_in$ and yCO_in.

In noninventive examples No. 101 to 105 according to FIG. 3b (comparative examples), impurities were found in each case in a total concentration of well above 10000 ppm, namely between 17900 and 31000 ppm. In all five comparative examples, the stoichiometry number of the mixed synthesis gas at the catalyst bed inlet is below 0.80, and the carbon monoxide concentration in the mixed synthesis gas is well above 20% by volume.

If the stoichiometry number of the mixed synthesis gas at the catalyst bed inlet is increased to 0.80 or more and the carbon monoxide concentration is simultaneously lowered to 20% by volume or less, in accordance with Examples 1 to 43, reduced by-product formation is observed, which is always below 10000 ppm in relation to the entirety of the by-products. At the same time, the maximum catalyst bed temperature was limited to 280° C. or less. In Examples 1 to 43, the maximum catalyst bed temperature has a range of 205° C. to 277° C.

If the maximum catalyst bed temperature is limited to 265° C. or less, the concentration of by-products reliably falls to 5000 ppm or less, as shown by Examples 1, 2, 6-10, 13-16, 19-24, 28 and 33-43.

If the maximum catalyst bed temperature is limited to 250° C. or less, the concentration of by-products falls further to 3500 ppm or less, as shown by Examples 8, 9, 14-16, 19-23, 35-38 and 41-43.

Even comparatively low stoichiometry numbers of 0.80 to 2.20 for the mixed synthesis gas at the catalyst bed inlet (SN_in), with observance of the conditions according to the invention, lead to less than 10000 ppm of impurities, as shown by Examples 9-23 and 34-43. In this connection, it is particularly favourable when the proportion of CO in the mixed synthesis gas is 9.0% to 13.0% by volume, since, in that case, in spite of the low stoichiometry number, a hydrogen conversion of well above 80% is reliably achieved, being from 86.8% to 98.7% here, as shown by Examples 9-12, 14-17, 19-21 and 23.

If the stoichiometry number of the mixed synthesis gas at the catalyst bed inlet is 2.0 or higher, the concentration of impurities is reliably 5000 ppm or less, as shown by Examples 1-9, 15, 16 and 24-36.

The process according to the invention is especially suitable for use of synthesis gases having a high carbon dioxide content. If the carbon dioxide content in the mixed synthesis gas is 25% by volume or more, there is reliably formation of less than 1000 ppm of by-products, as shown by Examples 34-43.

Embodiments of the invention are described with reference to different types of subject-matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one type of claim any combination of features relating to different types of subject-matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments. Other variations of the disclosed embodiments may be understood and executed by those skilled in the art of the field of the claimed invention from a study of the drawing, the disclosure and the dependent claims.

In the claims, the word "having" or "comprising" does not exclude further elements or steps, and the indefinite article "a" or "an" does not exclude a plurality. Reference numerals in the claims should not be interpreted as limiting the scope of the claims.

LIST OF REFERENCE SIGNS

| | |
|---|---|
| 1 | Process, pilot plant |
| 10-19 | Conduit |
| 20 | Mixing station |
| 21 | Reactor |
| 22, 26, 28 | Heat exchanger |
| 23 | Reaction tube |
| 24 | Cooling jacket |
| 25 | Catalyst bed |
| 27 | High-pressure separator |
| 29, 31 | Intermediate vessel |
| 30 | Low-pressure separator |
| 32 | Collecting vessel |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for producing methanol, comprising:
   a. providing a synthesis gas including carbon oxides and hydrogen;
   b. passing the synthesis gas at elevated pressure and elevated temperature through a catalyst bed of a methanol synthesis reactor for conversion of the synthesis gas to methanol thereby producing a product stream comprising crude methanol and unreacted synthesis gas;
   c. cooling the product stream for condensation and separation of crude methanol comprising at least methanol and water from the cooled product stream;
   d. recycling at least a portion of the unreacted synthesis gas to the catalyst bed inlet, wherein the unreacted synthesis gas is combined with the synthesis gas thereby producing a mixed synthesis gas, and passing the mixed synthesis gas at elevated pressure and elevated temperature through the catalyst bed of the methanol synthesis catalyst for conversion of the mixed synthesis gas to methanol, wherein the mixed synthesis gas at the catalyst bed inlet has a stoichiometry number SN of ≥0.80, where $$SN = \frac{n(H_2) - n(CO_2)}{n(CO) + n(CO_2)}, \text{ with } n \text{ in [mol]},$$

the catalyst bed in the conversion of the mixed synthesis gas to methanol has a maximum catalyst bed temperature of ≤280° C., and the mixed synthesis gas at the catalyst bed inlet has a carbon monoxide concentration of between 9.0% and 13.0% by volume.

2. The process according to claim 1, wherein the catalyst bed in the conversion of the mixed synthesis gas to methanol has a maximum catalyst bed temperature of ≤265° C.

3. The process according to claim 1, wherein the catalyst bed in the conversion of the mixed synthesis gas to methanol has a maximum catalyst bed temperature of 205° C. to 280° C.

4. The process according to claim 1, wherein the catalyst bed in the conversion of the mixed synthesis gas to methanol has a maximum catalyst bed temperature of 205° C. to 265° C.

5. The process according to claim 1, wherein the mixed synthesis gas at the catalyst bed inlet has a stoichiometry number SN of ≥2.0.

6. The process according to claim 1, wherein the mixed synthesis gas at the catalyst bed inlet has a stoichiometry number SN of 0.80 to 10.0.

7. The process according to claim 6, wherein the mixed synthesis gas at the catalyst bed inlet has a stoichiometry number of 0.80 to 2.20.

8. The process according to claim 7, wherein the mixed synthesis gas at the catalyst bed inlet has a carbon monoxide concentration of 9.0% to 13.0% by volume.

9. The process according to claim 1, wherein the synthesis gas has a stoichiometry number SN of 1.0 to 2.85.

10. The process according to claim 1, wherein the mixed synthesis gas at the catalyst bed inlet has a carbon dioxide concentration of ≥20.0% by volume.

11. The process according to claim 1, wherein the catalyst bed is divided into a multitude of catalyst bed stages arranged in series, wherein step c) is conducted downstream of each of the catalyst bed stages.

12. The process according to claim 1, wherein the synthesis gas is converted to methanol in the catalyst bed at a cooling temperature of the cooling medium used of 190° C. to 250° C.

* * * * *